Sept. 10, 1929.   J. R. REPLOGLE   1,727,941
SODA FOUNTAIN
Filed Aug. 23, 1926   2 Sheets-Sheet 1
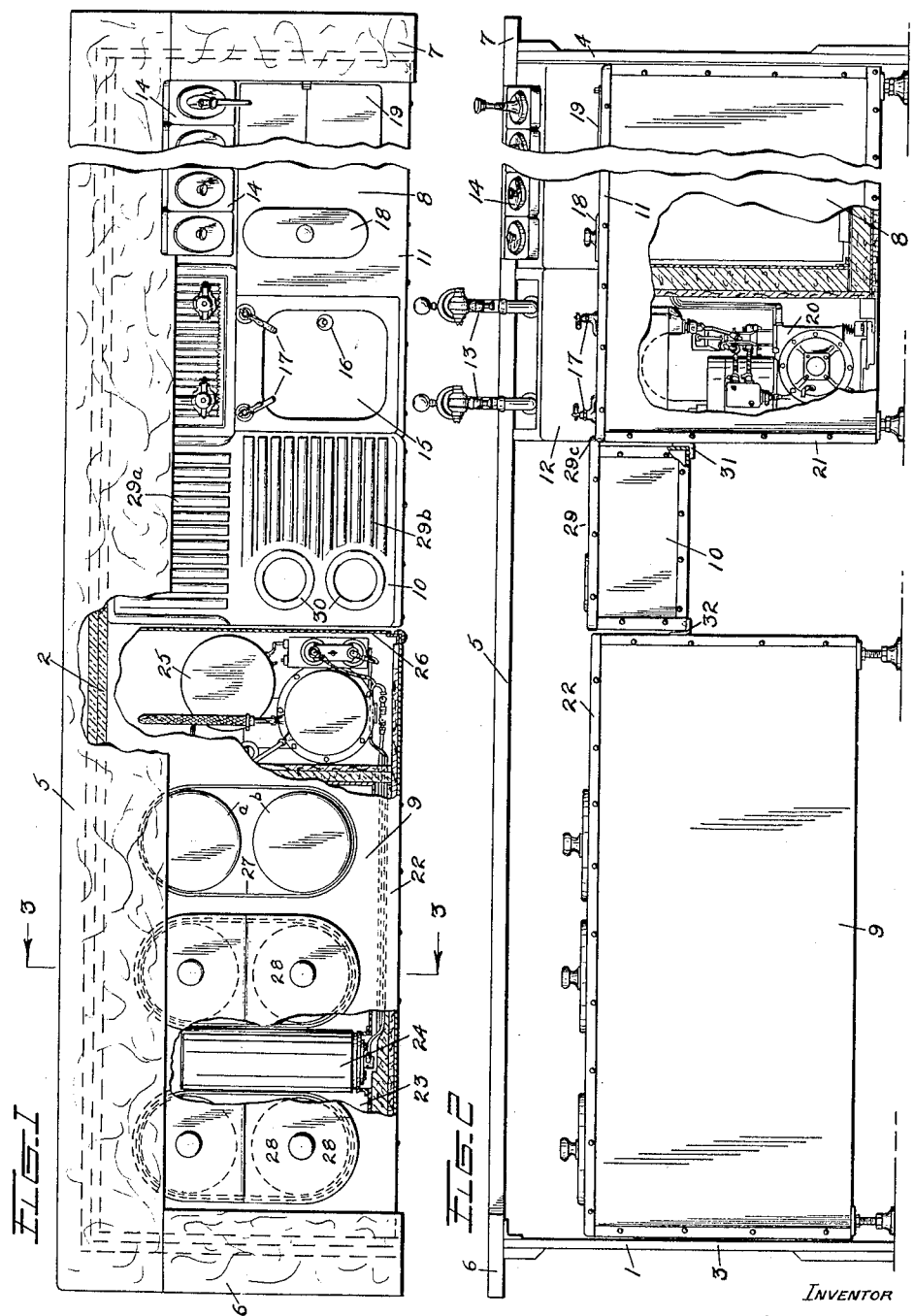
INVENTOR
John R. Replogle
By Ray A. Gehr
ATTORNEY

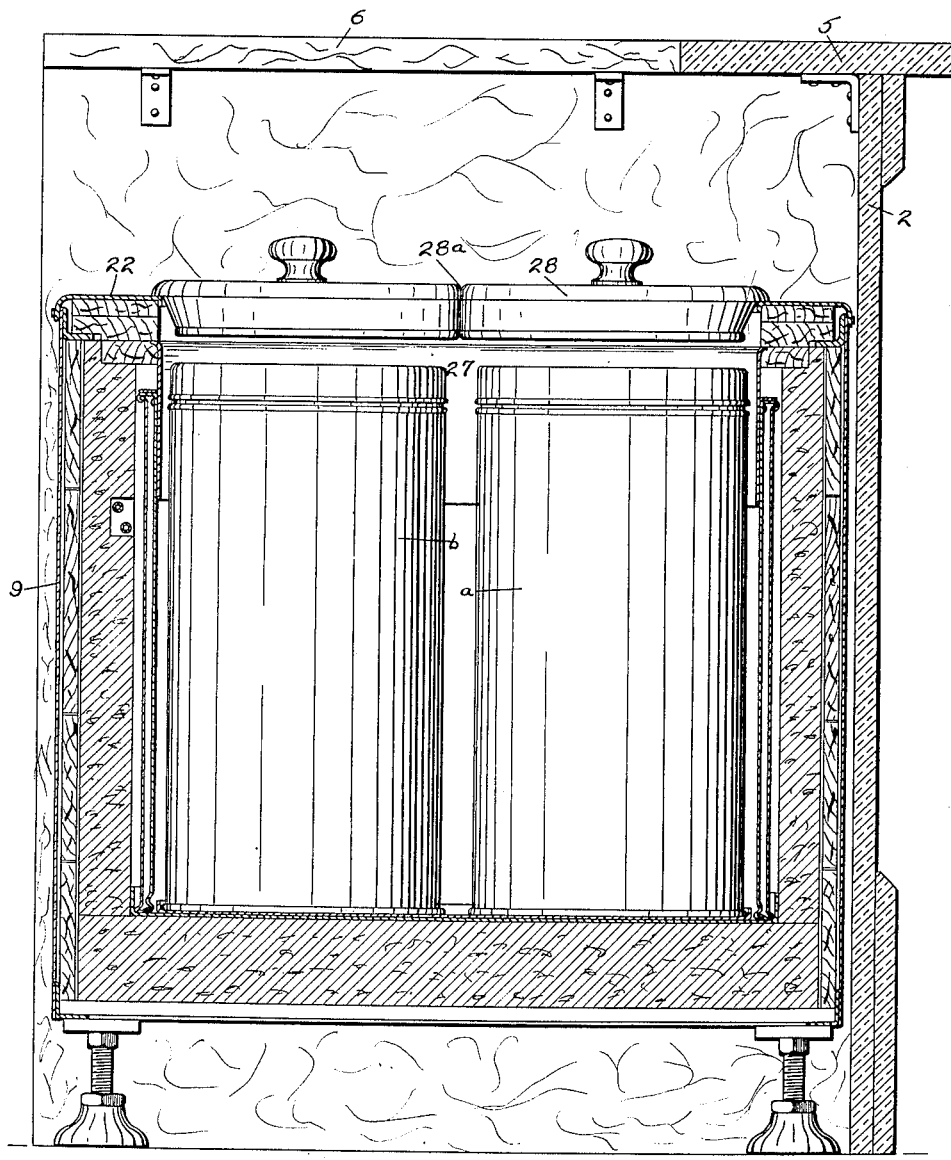

Patented Sept. 10, 1929.

1,727,941

UNITED STATES PATENT OFFICE.

JOHN R. REPLOGLE, OF DETROIT, MICHIGAN, ASSIGNOR, BY MESNE ASSIGNMENTS, TO KELVINATOR CORPORATION, OF DETROIT, MICHIGAN, A CORPORATION OF MICHIGAN.

SODA FOUNTAIN.

Application filed August 23, 1926. Serial No. 130,839.

The invention relates to improvements in soda fountains such as are used in dispensing soda water, various other drinks or beverages, ice cream soda, ice cream, and the like.

One of the various objects of the invention is the provision of a soda fountain made up of a plurality of separate but related units which are of such a character as to facilitate commercial production at a minimum cost and render easy the installation of the units to constitute a working fountain.

Another object of the invention is the provision of a mechanically refrigerated soda fountain comprising an ice cream holding unit and a beverage dispensing unit each of which has its own independently operable refrigerating apparatus, thus facilitating the maintenance of the different temperatures required for the ice cream and the beverages and at the same time meeting widely prevailing conditions incident to the commercial production and distribution of ice cream.

A further object of the invention is the provision of a multiple unit fountain such as last referred to in which the respective units are so constructed and so arranged in relation to each other that servicing of the refrigeration apparatus of the respective units is rendered easy and convenient.

Another object of the invention is the provision of a multiple unit fountain comprising an ice cream holding unit and a beverage dispensing unit which are so constructed, arranged and related to each other that the dispensing therefrom, especially of ice cream sodas, may be accomplished conveniently and efficiently.

Another object of the invention is the provision of a soda fountain in which the ice cream holding part of the structure has a maximum capacity for given dimensions without interfering with the use of a wide overhanging counter for the fountain.

Other objects more or less incidental or ancillary to the foregoing will be apparent from the following description in which is set forth in conjunction with the accompanying drawings a preferred embodiment of the invention.

In the drawings,

Fig. 1 is a plan view of the fountain with some of the parts broken away to permit illustration on a large scale and to disclose features of interior construction.

Fig. 2 is a rear elevation of the fountain shown in Fig. 1, some of the parts, as in Fig. 1, being broken away.

Fig. 3 is an enlarged sectional view on the line 3—3, Fig. 1.

Referring in detail to the construction illustrated, 1 indicates as an entirety a counter structure which comprises a front upright wall 2, upright end walls 3 and 4, a longitudinally extending top section 5 supported by the upright wall 2 and top sections 6 and 7 at the ends of the counter. The counter structure may be made of ornamental marble, glass or the like in accordance with the usual practice.

Within the bounds of the upright walls of the counter are arranged the several units making up the working parts of the fountain. 8 designates as an entirety a beverage dispensing unit. 9 designates as an entirety an ice cream holding and dispensing unit and 10 designates as an entirety a drain and work board structure which is interposed between the adjacent ends of the two units 8 and 9. The beverage dispensing unit 8 is, in form, a box-like structure having the usual top 11 at a suitable working height and an upstanding extension 12 near its front side which carries liquid draft arms 13, 13 and a series of jars 14, 14 for fruit flavors. The draft arms 13, 13 are connected with cooling coils (not shown), of any suitable character and which in turn are connected with sources of charged and plain water, respectively. The draft arms 13, 13, it will be noted, are arranged at the end of the unit 8 adjacent the drain board structure 10. Directly behind the draft arms 13,-13 is a sink 15 provided with the usual waste discharge 16 and faucets 17 which are connected with hot and cold water supplies.

Behind the row of jars 14, 14 the top 11 is fitted with a series of lids or covers giving access to different refrigerated chambers of the unit. Thus the elongated cover 18 gives access to an ice freezing chamber. The lids 19 give access to a dry chamber for bottled goods and between the cover 18 and the lid 19 in the part of the fountain structure broken away are other covers leading to a chipped-ice compartment, etc. The illustration of these latter parts of the fountain is not called for since so far as the present invention is concerned they may be of any desired construction. However, it is noted that the beverage dispensing unit 8 constitutes the subject of my copending application Serial No. 133,773, filed September 7, 1926, and reference may be had thereto for a full disclosure of its construction.

In the end of the unit 8 adjacent the drain board 10 is a chamber which is occupied by a motor driven compressor-condenser refrigerating unit 20 constituting a part of the refrigerating mechanism of the unit 8, the compressor and condenser being suitably connected with a vaporizer or boiler which is not shown but which is disposed in a refrigerated section of the unit 8, as will readily be understood. The end wall of the unit 8 is in the form of a removable panel 21 which when removed affords free access to the compressor-condenser unit 20. The unit 8 constitutes a self-contained independently operable unit for dispensing cooled beverages on draft and in bottles, for freezing ice and maintaining fruits, syrups and the like at suitably low temperatures.

The fountain unit 9 is a mechanically refrigerated ice cream cabinet of the general character of that disclosed in my Patent No. ,476,546, dated December 4, 1923, though in structural detail it more closely resembles the cabinet shown in my pending application Serial No. 673,678, filed Nov. 9, 1923. The cabinet is, in form, a box-like structure having its top 22 disposed at the level of the top 11 of the beverage unit 8. The cabinet is divided into two main chambers one of which is occupied by a brine tank 23, this tank extending substantially from the bottom wall of the cabinet to the top wall thereof. Mounted in the brine tank 23 is the vaporizer 24 of the cabinet refrigerating mechanism and this vaporizer is suitably connected to a motor driven compressor-condenser unit 25 which is mounted in the second main chamber of the cabinet. As in the case of the beverage unit 8, the end wall 26 of the cabinet 9 is in the form of a removable panel and by its removal affords access to the compressor-condenser unit 25. Also, as in the case of the unit 8, the unit 9 has its compressor-condenser mechanism in the end of the cabinet adjacent the drain board structure 10.

The ice cream cabinet 9 illustrated has a capacity to hold six full-size (5 gallon) cans of ice cream. Heretofore, it has been customary to provide individual cylindrical, open-topped chambers or "holes" for the cans of ice cream and these holes have commnoly been arranged in two parallel rows extending lengthwise of the cabinet as this is found to afford maximum capacity for a cabinet of given dimensions. In the present case, however, the cabinet illustrated has the brine tank 23 provided with three open-topped chambers 27, 27 which in horizontal section have straight sides and rounded ends and which are long enough transversely of the cabinet to accommodate two full-size cans of ice cream, such as are shown for example at $a$, $b$ in Fig. 1. The holes 27 are preferably covered by removable lids 28, 28 each of which comprises two sections hinged together at 28ᵃ so that either the front or rear part of the lid can be lifted to uncover the corresponding can of ice cream.

It will be observed that the top section 5 of the fountain counter overhangs the front portion of the holes 27 so that a front can $a$ of ice cream cannot be lowered into its hole or an empty can $a$ removed from its hole without interfering with the counter top 5. This difficulty is obviated by the use of the horizontally elongated holes 27 which permit the ready insertion and removal of the front cans $a$ when the rear row of cans $b$ are not in place. That is to say, the front can $a$ can be lowered into position in the rear part of the hole 27 and then slid forward into its proper position, after which the rear can $b$ can be lowered directly into its proper position; and if it becomes necessary to replace the can $a$ with a full can before the can $b$ is similarly replaced, the latter can be temporarily lifted out to permit the change of the can $a$.

The drain and work board section 10 of the fountain assembly has a top 29 which is suitably grooved at 29ᵃ and 29ᵇ to insure drainage toward and into the sink 15 of the beverage unit 8. The drain board section also has its top preferably apertured to receive porcelain jars 30, 30 which serve for the rinsing of dipping ladles and the like. The drain board section 10 can be removably supported from either or both of the fountain sections 8 and 9, but in the construction illustrated it is supported from both of the units 8 and 9. The top 29 has its edge or lip 29ᶜ overlying the adjacent edge of the top 11 of the unit 8. Also the unit 8 has its front and rear upright corner posts fitted with brackets 31 which engage the adjacent under side of the drain board structure 10 while the upright corner posts of the ice cream cabinet unit 9 are provided with brackets 32 which similarly support the other side of the drain board structure 10. The construction is such that the section 10 can readily be lifted off the brackets 31, 32 and separated from the units 8 and 9, thus fully exposing the space between the latter units and permitting removal of their end panels 21 and 26, respectively, to afford access to either or both of the compressor-condenser mechanisms of the units 8 and 9.

Beverage dispensing units and ice cream units such as those illustrated are of moderate size and are well adapted to manufacture and distributon on a quantity basis. Such units are also readily assembled on the premises of the user to form a complete working fountain. Furthermore, the provision of separate units for the beverage dispensing and ice cream holding and dispensing parts of a soda fountain structure makes it possible for the ice cream manufacturer who supplies the owner of the fountain with cream to furnish and own the ice cream cabinet while the user of the fountain may own and install the other parts thereof, thus complying with a rather extensive commercial practice in this regard.

By constructing the beverage dispensing unit 8 with its draft arms adjacent the end of said unit nearest the ice cream cabinet unit, the person serving the fountain is enabled to make up and dispense ice cream sodas with a minimum amount of walking back and forth.

The arrangement of the sink 15 at the end of the unit 8 makes possible the arrangement of the drain board section 10 between the units 8 and 9 thus providing a convenient work table between the sections 8 and 9 as well as conveniently locating the rinsing jars 30; and at the same time the provision of the removable drain board section in this location makes possible the arrangement of the compressor-condenser mechanisms adjacent the space occupied by the drain board so that access may readily be had to the compressor-condenser mechanisms of both units, as previously noted.

It is of course clear that by the provision of entirely separate and independently operating refrigeration mechanisms for the ice cream holding unit and the beverage dispensing unit, the respective temperatures desirable for said units are readily secured and maintained by the separate regulation of the two refrigeration mechanisms.

While the forms of construction which I have illustrated and described are such as I prefer, it will be understood there can be departure in various respects from the construction disclosed without departing from the invention as defined by the appended claims.

I claim:

1. In a dispensing apparatus, the combination of a pair of spaced cabinets having supporting means on the adjacent ends thereof, one of said cabinets being provided with a sink adjacent one end; and a drain table carried by the supporting means on said cabinets to drain liquids therefrom into the sink in said cabinet.

2. In a dispensing apparatus, the combination of a pair of spaced cabinets having supporting means on the adjacent ends thereof; and a detachable work table carried intermediate said cabinets by said supporting means.

In testimony whereof, I hereunto affix my signature.

JOHN R. REPLOGLE.